(12) United States Patent
Kim et al.

(10) Patent No.: US 9,709,783 B2
(45) Date of Patent: Jul. 18, 2017

(54) DISPLAY APPARATUS HAVING BEZEL HIDING MEMBER

(71) Applicant: SAMSUNG ELECTRONICS CO., LTD., Suwon-si (KR)

(72) Inventors: Jong-hoi Kim, Suwon-si (KR); Kun-ho Cho, Suwon-si (KR); Yong-hun Kwon, Anyang-si (KR); Yae-kyung Son, Uiwang-si (KR); Young-min Lee, Bucheon-si (KR); Suk-ju Choi, Jeonju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 14/228,496

(22) Filed: Mar. 28, 2014

(65) Prior Publication Data
US 2015/0116852 A1    Apr. 30, 2015

(30) Foreign Application Priority Data
Oct. 31, 2013    (KR) ......................... 10-2013-0130967

(51) Int. Cl.
*G02B 5/04* (2006.01)
*G02B 17/00* (2006.01)
(Continued)

(52) U.S. Cl.
CPC ........... *G02B 17/002* (2013.01); *G02B 5/045* (2013.01); *G02B 6/0053* (2013.01);
(Continued)

(58) Field of Classification Search
CPC ..... G02F 1/133308; G02F 2001/13332; G02F 2001/133388; G02B 3/08; G02B 5/045;
(Continued)

(56) References Cited

U.S. PATENT DOCUMENTS 6,483,482 B1    11/2002  Kim
6,927,908 B2    8/2005   Stark
(Continued)

FOREIGN PATENT DOCUMENTS

EP    2 395 496 A1    12/2011
JP    2001-005414 A   1/2001
(Continued)

OTHER PUBLICATIONS

Communication from the European Patent Office issued Mar. 11, 2015 in a counterpart European Application No. 14182940.8.
(Continued)

*Primary Examiner* — Thomas K Pham
*Assistant Examiner* — Nicholas R Pasko
(74) *Attorney, Agent, or Firm* — Sughrue Mion, PLLC

(57) ABSTRACT

A display apparatus includes a display main body having a screen and a bezel that surrounds the screen, and a bezel hiding member mounted on the bezel to cover the bezel. The bezel hiding member includes a body portion configured to refract an image light that emitted from an edge region of the screen, and a plurality of prism projections formed to project from the body portion to change a path of the refracted image light to a front side of the display main body.

17 Claims, 11 Drawing Sheets

(51) Int. Cl.
*G02B 17/08* (2006.01)
*G02F 1/1333* (2006.01)
*G02F 1/1335* (2006.01)
*F21V 8/00* (2006.01)

(52) U.S. Cl.
CPC .......... *G02B 6/0078* (2013.01); *G02B 6/0088* (2013.01); *G02B 17/086* (2013.01); *G02F 1/133308* (2013.01); *G02F 1/133526* (2013.01); *G02B 6/0058* (2013.01); *G02F 2001/13332* (2013.01)

(58) Field of Classification Search
CPC .. G02B 6/0053; G02B 6/0078; G02B 17/002; G02B 27/1066; G02B 27/126
USPC .......... 359/450, 454, 804, 831, 837; 345/1.3
See application file for complete search history.

(56) References Cited

U.S. PATENT DOCUMENTS

| | | | |
|---|---|---|---|
| 8,541,934 | B2 | 9/2013 | Watanabe et al. |
| 9,395,472 | B2* | 7/2016 | Kim ................. G02B 5/045 |
| 9,398,274 | B2* | 7/2016 | Jeong ................. H04N 9/12 |
| 2003/0231144 | A1* | 12/2003 | Cho ................... G02B 5/045 345/1.3 |
| 2004/0051944 | A1 | 3/2004 | Stark |
| 2010/0238090 | A1* | 9/2010 | Pomerantz .......... G02F 1/13336 345/1.3 |
| 2010/0259566 | A1* | 10/2010 | Watanabe ............... G02B 3/08 345/690 |
| 2011/0080665 | A1* | 4/2011 | Myers ................. G02F 1/13336 359/837 |
| 2011/0128208 | A1* | 6/2011 | Choi ........................ H01J 11/12 345/1.1 |
| 2011/0215990 | A1* | 9/2011 | Liesenberg .............. G09G 5/00 345/1.3 |
| 2011/0242686 | A1* | 10/2011 | Watanabe .......... G02B 17/0884 359/804 |
| 2011/0255301 | A1* | 10/2011 | Watanabe .......... G02F 1/13336 362/558 |
| 2012/0049718 | A1 | 3/2012 | Watanabe et al. |
| 2012/0218696 | A1* | 8/2012 | Kim .................. G02F 1/133308 361/679.01 |
| 2013/0235560 | A1* | 9/2013 | Etienne .................. G02B 5/045 362/97.1 |
| 2013/0235561 | A1* | 9/2013 | Etienne ............. G02F 1/133308 362/97.1 |
| 2013/0271957 | A1* | 10/2013 | Etienne ............. G02F 1/133308 362/97.1 |
| 2014/0126075 | A1* | 5/2014 | Comstock, II ......... G02B 5/045 359/831 |

FOREIGN PATENT DOCUMENTS

| | | |
|---|---|---|
| JP | 5269983 B2 | 8/2013 |
| KR | 10-2003-0074628 A | 9/2003 |
| WO | 2013/055853 A1 | 4/2013 |

OTHER PUBLICATIONS

International Search Report for PCT/KR2014/006806 dated Nov. 18, 2014 [PCT/ISA/210].
Written Opinion for PCT/KR2014/006806 dated Nov. 18, 2014 [PCT/ISA/237].

* cited by examiner

DISPLAY APPARATUS HAVING BEZEL HIDING MEMBER

CROSS-REFERENCE TO RELATED APPLICATION

This application claims priority from Korean Patent Application No. 10-2013-0130967 filed on Oct. 31, 2013, in the Korean Intellectual Property Office, the disclosure of which is incorporated herein by reference in its entirety.

BACKGROUND

1. Field

Apparatuses consistent with exemplary embodiment relate to a display apparatus, and more particularly to a display apparatus having a bezel hiding member that hides a bezel so that the bezel is not visible.

2. Description of the Related Art

A display apparatus, such as a light crystal display (LCD), a plasma display, or an organic light emitting display (OLED), includes a screen on which an image is displayed and a bezel that surrounds the screen.

Since the bezel is a region on which an image is not displayed, it is desirable to make the bezel as thin as possible. Accordingly, technology has been developed to minimize the width of the bezel.

On the other hand, in order to prevent a user from seeing the bezel, the bezel hiding members to optically hide the bezel have been proposed.

However, the related art bezel hiding members are arranged to overlap an edge region of the screen. As a result, an image that corresponds to the edge region may be distorted, which may cause deterioration of the image quality.

SUMMARY

Exemplary embodiments address at least the above problems and/or disadvantages and other disadvantages not described above. Also, the exemplary embodiments are not required to overcome the disadvantages described above, and may not overcome any of the problems described above.

Accordingly, one or more exemplary embodiments provide a bezel hiding member that does not invade edge regions of a screen and a display apparatus having the bezel hiding member.

According to an aspect of an exemplary embodiment, a display apparatus includes a display main body having a screen and a bezel that surrounds the screen; and a bezel hiding member mounted on the bezel to cover the bezel, wherein the bezel hiding member includes a body portion configured to refract an image light that comes out from an edge region of the screen; and a plurality of prism projections formed to project from the body portion to change a path of the image light that is refracted from the body portion to a front side of the display main body.

The body portion may be attached to the bezel so that the body portion does not hide the screen.

The body portion may include an attachment surface attached to the bezel; a light incident surface extending from an inner end of the attachment surface to make the image light incident thereto; and a boundary surface extending between an outer end of the attachment surface and an upper end of the light incident surface and forming a boundary between a plurality of prism projections.

The attachment surface and the light incident surface may be arranged not to hide the screen.

The light incident surface may be arranged perpendicularly to the attachment surface.

The boundary surface may include a single plane.

The boundary surface may include two or more planes.

The boundary surface may include a first boundary surface extending from the upper end of the light incident surface; and a second boundary surface extending between the first boundary surface and the outer end of the attachment surface.

The first boundary surface may be arranged in parallel to the attachment surface, and the second boundary surface may be arranged to be inclined against the attachment surface.

The boundary surface may be a single curved surface.

The boundary surface may be a spherical surface or an aspherical surface.

Each of the prism projections may include a total reflection surface configured to totally reflect the refracted image light; and a light emission surface configured to emit the image light that is reflected by the total reflection surface.

Each of the prism projections may have a pointed or rounded outer end.

According to an aspect of an exemplary embodiment, a multivision display apparatus includes a plurality of unit displays, wherein each of the plurality of unit displays includes a display main body having a screen and a bezel that surrounds the screen; and a bezel hiding member mounted on the bezel to cover the bezel, and the bezel hiding member includes a body portion configured to refract an image light that comes out from an edge region of the screen; and a plurality of prism projections formed to project from the body portion to change a path of the image light that is refracted from the body portion to a front side of the display main body.

BRIEF DESCRIPTION OF THE DRAWINGS

The above and/or other aspects will be more apparent by describing certain exemplary embodiments, with reference to the accompanying drawings, in which.

DETAILED DESCRIPTION OF EXEMPLARY EMBODIMENTS

Figure 1:
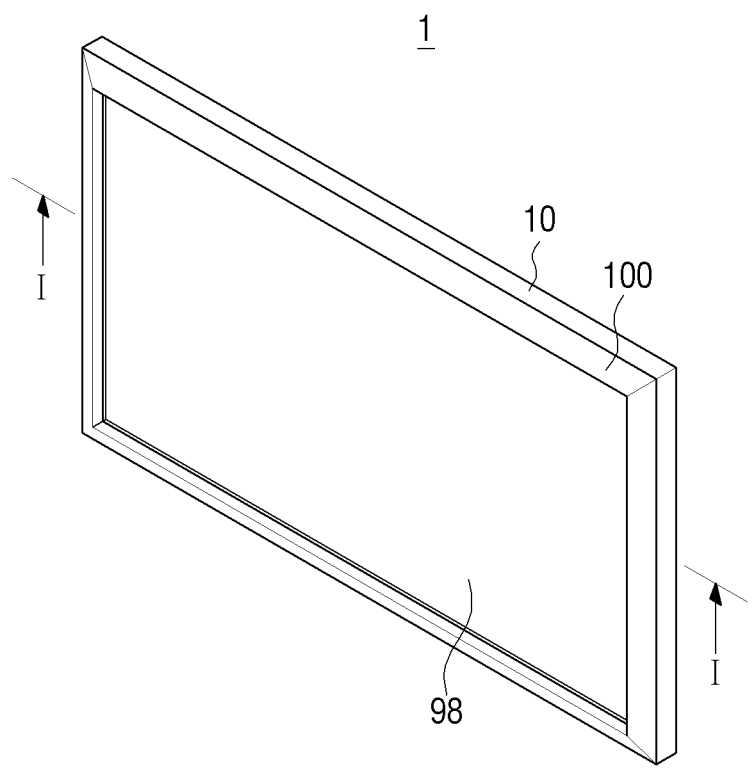
FIG. 1 is a perspective view of a display apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Figure 2:
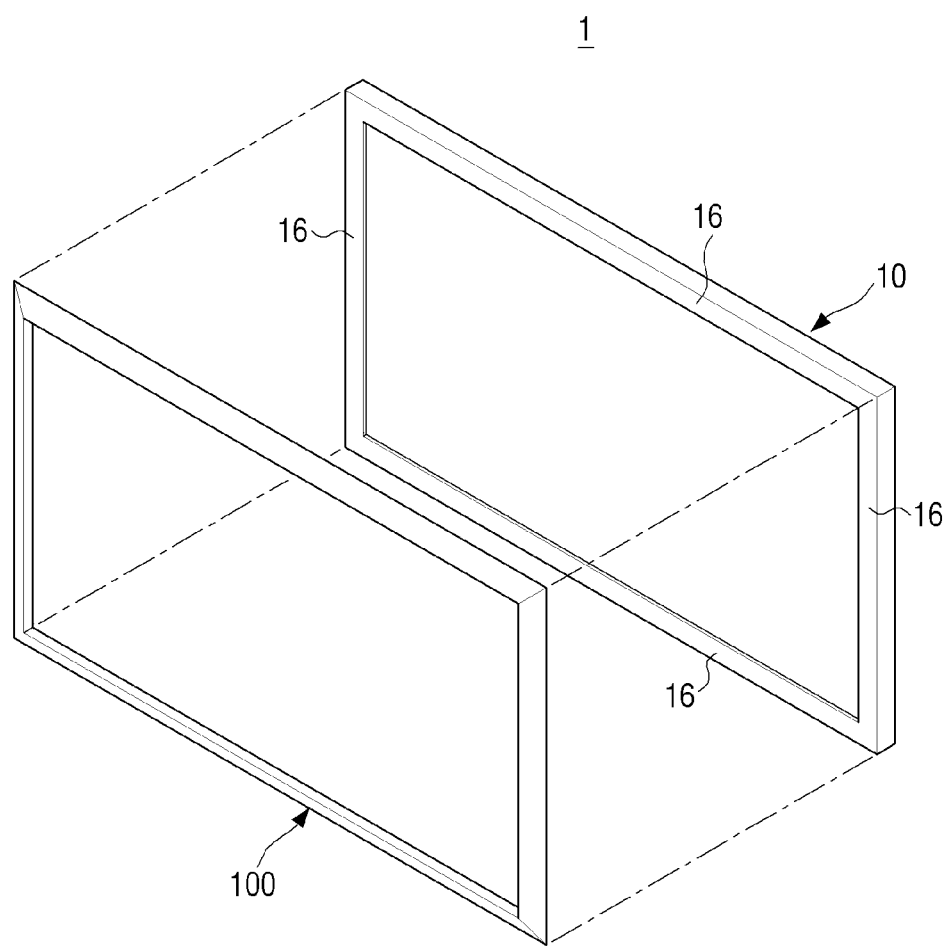
FIG. 2 is a partially exploded perspective view of the display apparatus illustrated in FIG. 1.

FIG. 1 is a perspective view of a display apparatus according to an exemplary embodiment. FIG. 2 is a partially exploded perspective view of the display apparatus illustrated in FIG. 1, and FIG. 3 is a cross-sectional view taken along line I-I of FIG. 1.

Figure 3:
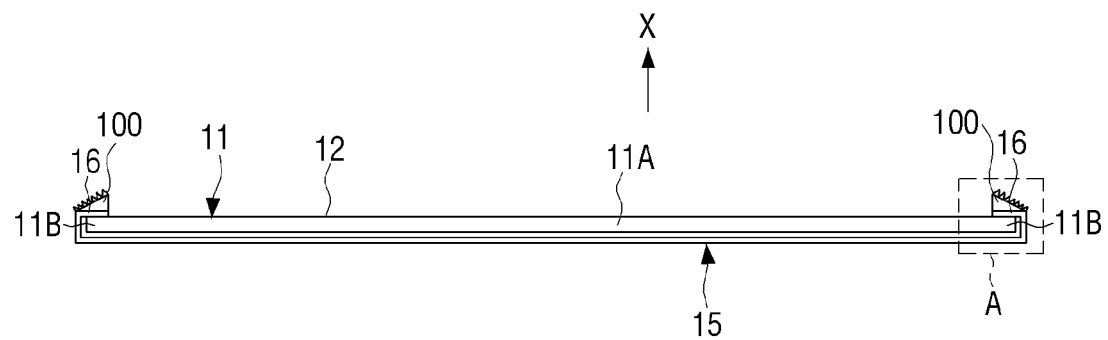
FIG. 3 is a cross-sectional view taken along line I-I of FIG. 1.

Referring to FIGS. 1 to 3, a display apparatus 1 according to an exemplary embodiment is a flat panel display. The display apparatus 1 may include various flat display devices that include a flat display panel, such as an LCD panel, a plasma display panel (PDP), or an OLED panel. As an example, the display apparatus 1 may include a television receiver or a computer monitor.

Referring to FIGS. 1 to 3, the display apparatus 1 includes a display main body 10 and a bezel hiding member 100.

The display main body 10 includes a display panel 11 and a housing 15.

The display panel 11 includes a flat display panel, and as an example, may be an LCD panel, a PDP, or an OLED panel. The display panel 11 has a screen 12 is exposed out of the housing 15, and the display apparatus 1 displays an image through the screen 12 of the display panel 11.

The display panel 11 includes an active region 11A that corresponds to the screen 12 and a non-active region 11B that surrounds the active region 11A. The active region 11A is a region on which an image is displayed through the screen 12, and the non-active region 11B is a region on which the image is not displayed.

The housing 15 accommodates the display panel 11 so that the screen 12 is exposed to an outside. Although not illustrated, other components, such as a control board and a power board, for operating the display panel 11 may be accommodated in the housing 15. The housing 15 has a bezel 16 that hides the non-active region 11B of the display panel 11.

In order to prevent a bezel 16 from being visually seen by a viewer, the bezel hiding member 100 is mounted on the bezel 16. The bezel hiding member 100 extends along the region of the bezel 16 to cover the bezel 16. The bezel hiding member 100 is attached to the bezel 16 with an adhesive member, such as an adhesive, an adhesive layer, or an adhesive tape. As an example, the bezel hiding member 100 may be made of transparent plastic, such as polycarbonate (PC) or poly(methyl methacrylate) (PMMA).

Figure 4:
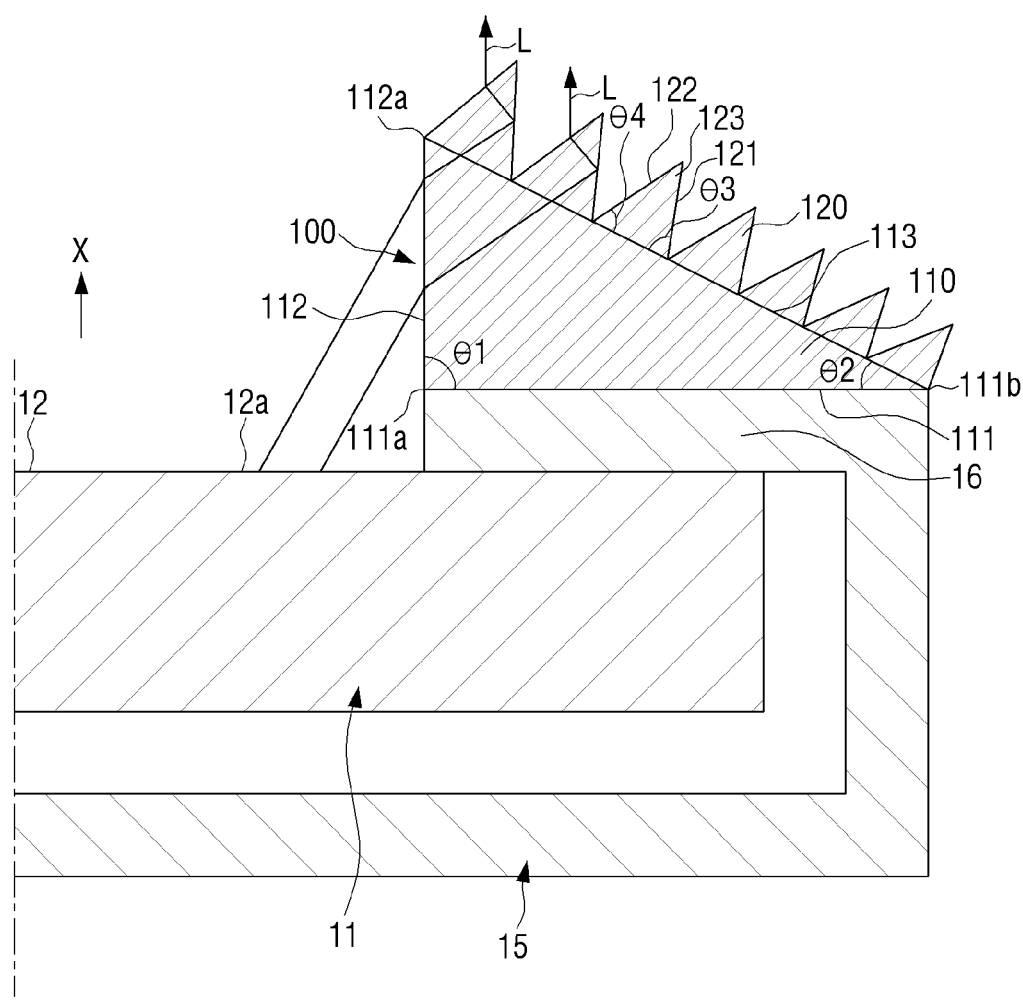
FIG. 4 is an enlarged cross-sectional view of a region A of FIG. 3.

Referring to FIG. 4 that is an enlarged cross-sectional view of a region A of FIG. 3, the bezel hiding member 100 will be described in more detail.

As illustrated in FIG. 4, the bezel hiding member 100 includes a body portion 110 and a plurality of prism projections 120, i.e., optical members.

The body portion 110 includes an attachment surface 111 attached to the bezel 16, a light incident surface 112 to which a part of an image light is incident from the screen 12, and a boundary surface 113 forming a boundary with the plurality of prism projections 120.

Figure 5A:
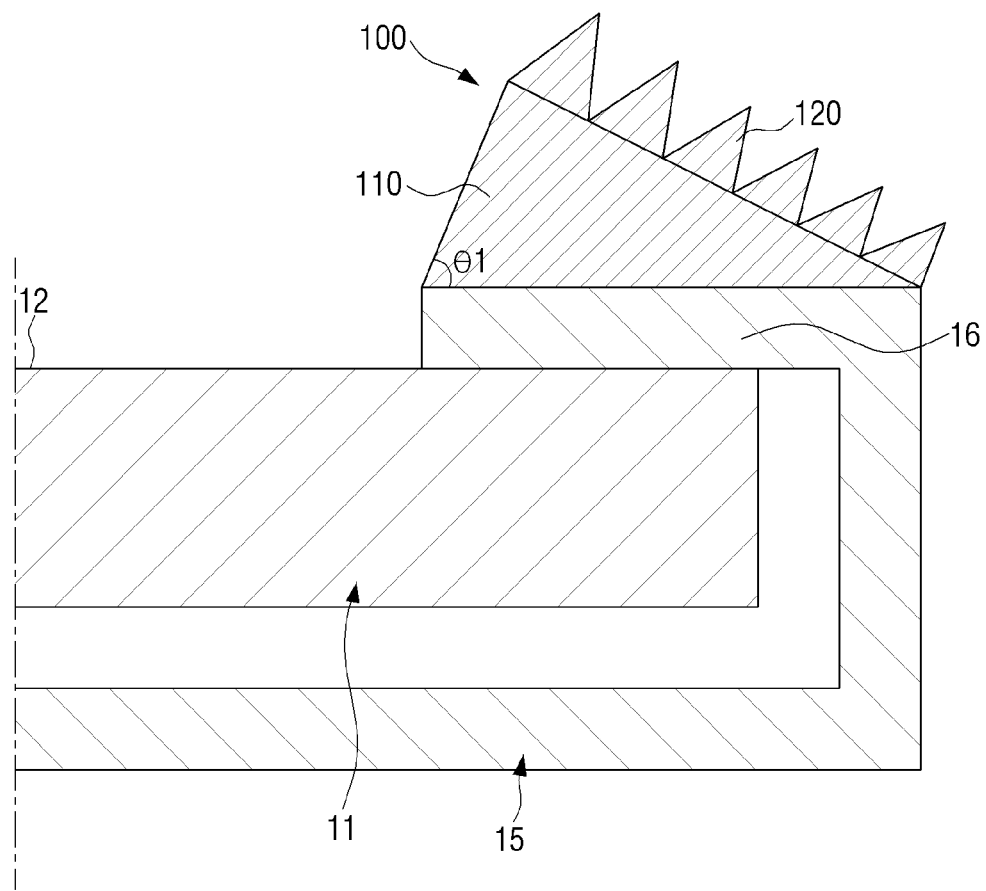
FIGS. 5A and 5B are cross-sectional views, illustrating bezel hiding members.
Figure 5B:
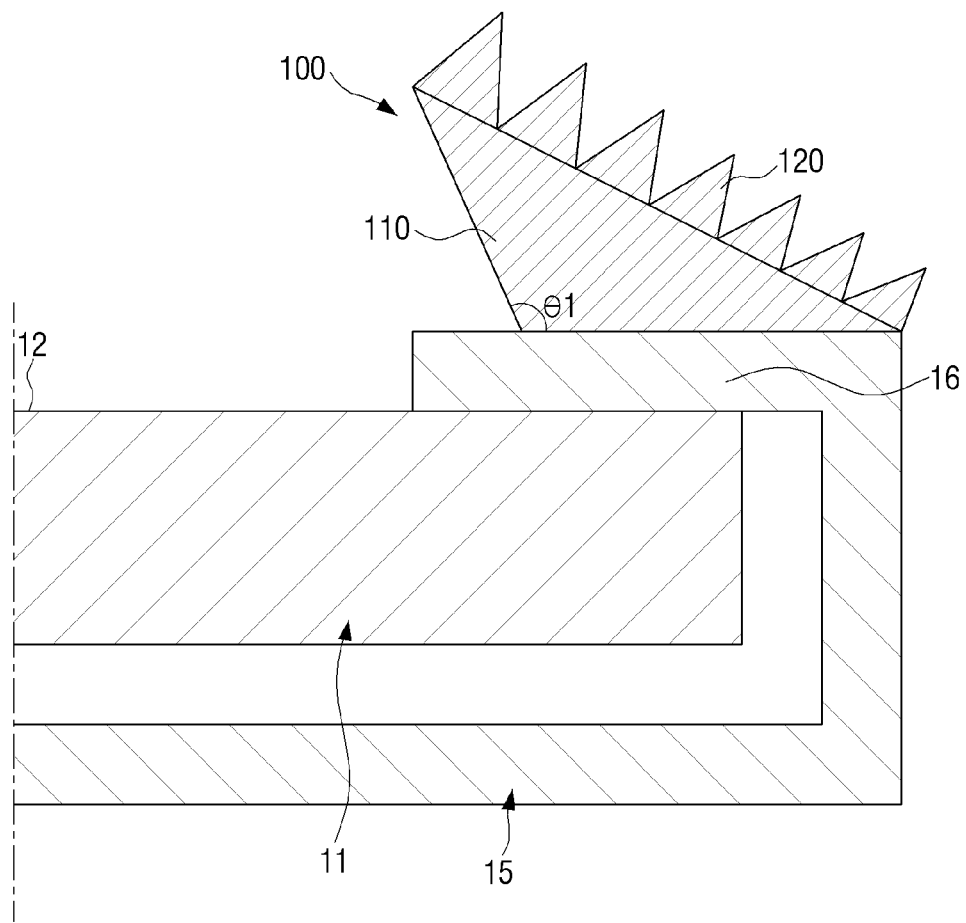

The light incident surface 112 extends from an inner end 111a of the attachment surface 111 and may be inclined with respect to the attachment surface 111. For example, as illustrated in FIG. 4, an angle θ1 formed between the light incident surface 112 and the attachment surface 111 may be 90°. As an alternative, the angle θ1 may be an acute angle as illustrated in FIG. 5A, or may be an obtuse angle as illustrated in FIG. 5B. As described above, the angle θ1 may be selected in the range of 0° to 180°.

In FIGS. 4, 5A and 5B, it can be seen that the attachment surface 111 and the light incident surface 112 are arranged so as not to hide the screen 12 at all. That is, the bezel hiding member 100 is arranged so as not to overlap the screen 12. Accordingly, an image that is displayed on the screen 12 is prevented from being distorted by the bezel hiding member 100. Unlike this, if the bezel hiding member 100 is arranged to overlap the screen 12, the image may be greatly distorted by the bezel hiding member 100, and this causes the quality of the image to deteriorate.

The boundary surface 113 extends between an outer end 111b of the attachment surface 111 and an upper end 112a of the light incident surface 112. A plurality of prism projections 120 are formed to project from the boundary surface 113. In the case where the body portion 110 and the prism projections 120 are integrally formed, the boundary surface 113 may be a virtual surface. An angle θ2 that is formed between the boundary surface 113 and the attachment surface 111 may be an acute angle.

As illustrated in FIG. 4, the boundary surface 113 may be a single plane.

Figure 6A:
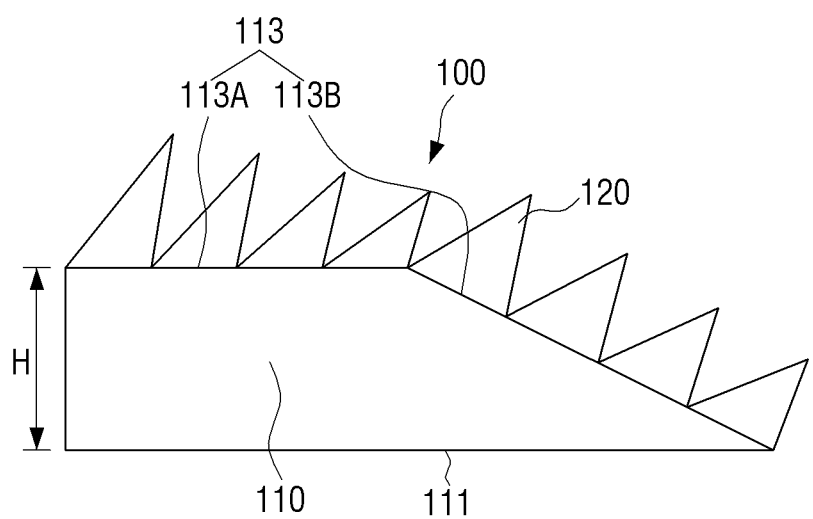
FIGS. 6A and 6B are cross-sectional views illustrating bezel hiding members.

Alternatively, as illustrated in FIG. 6A, the boundary surface 113 may include a first boundary surface 113A arranged in parallel to the attachment surface 111 and a second boundary surface 113B arranged to be inclined with respect to the attachment surface 111. In this case, the height H of the bezel hiding member 100 can be reduced. The boundary surface 113 may include three or more planes. Thus, the boundary surface 113 may include one or more planes.

Figure 6B:
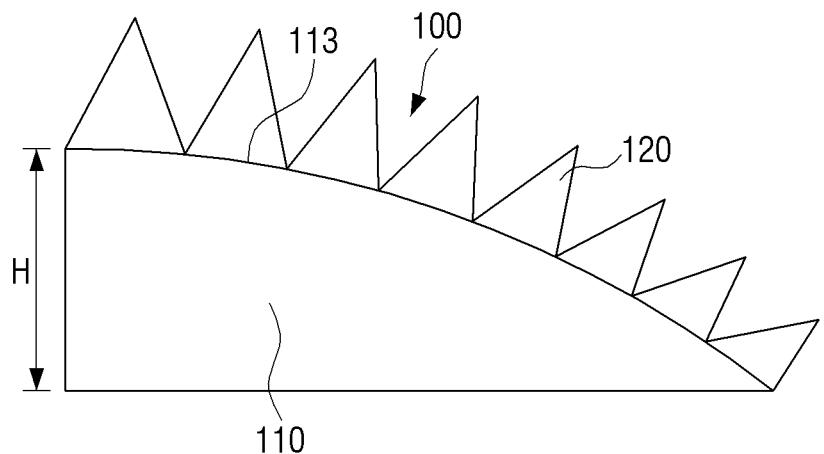

Alternatively, as illustrated in FIG. 6B, the boundary surface 113 may be a single curved surface. In this case, in the same manner as in FIG. 6A, the height H of the bezel hiding member 100 can be reduced. As an example, the boundary surface 113 may be a part of a spherical surface or a part of an aspherical surface, but is not limited thereto. The boundary surface 113 may include one, two, three or more curved surfaces.

The plurality of prism projections 120 are formed to project from the body portion 110. The prism projections 120 serve to change a path of the image light that is emitted from an edge region 12a of the screen 12 toward a front side 98 (i.e., in an X-direction indicated in FIG. 4) and refracted by the body portion 110 toward the boundary surface 113.

One or more of the prism projections 120 includes a reflection surface 121 configured to reflect the image light refracted from the light incident surface 112 of the body portion 110, and a light emission surface 122 configured to emit the image light that is reflected by the reflection surface 121. The reflection surface 121 is configured to reflect all or substantially all of the image light refracted from the light incident surface 112.

As illustrated in FIG. 4, an angle θ3 is formed between the reflection surface 121 and the boundary surface 113, and an angle θ4 is formed between the light emission surface 122 and the boundary surface 113. The angles θ3 and θ4 are selected so that the image light that is emitted from the prism projections 120 travels substantially perpendicularly to the screen 12.

Figure 7:
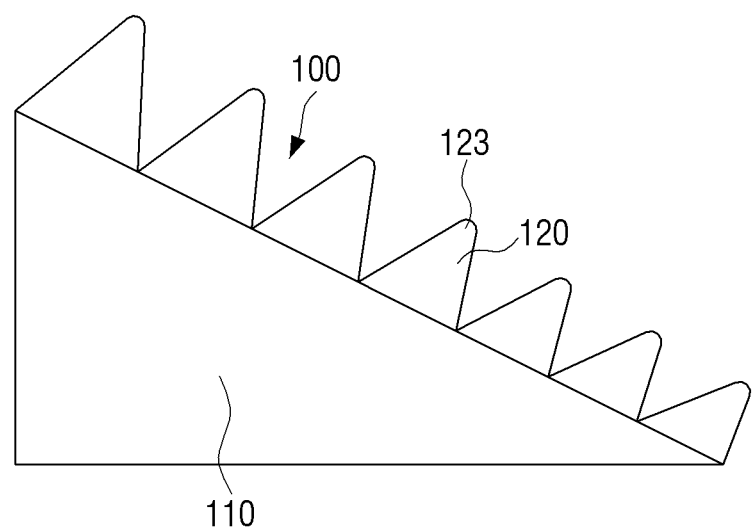
FIG. 7 is cross-sectional view illustrating bezel hiding member.

As illustrated in FIG. 4, each of the prism projections 120 may have a pointed outer end 123. Alternatively, as illustrated in FIG. 7, each of the prism projections 120 may have a rounded outer end 123.

Referring to FIG. 4, a portion of the image light L that is emitted by an edge region 12a of the screen 12 is incident on the light incident surface 112 of the body portion 110. The incident image light L is refracted by the light incident surface 112 of the body portion 110, and the refracted image light L passes through the boundary surface 113 and reaches the reflection surface 121 of the prism projection 120. The image light L is reflected to the side of the light emission surface 122 by the reflection surface 121, and the reflected image light L is emitted from the light emission surface 122 after being refracted by the light emission surface 122. In this case, the image light L is emitted along the direction that is substantially the same direction as the direction (X-direction in FIG. 4) in which the image is displayed from the screen 12.

Thus, the image light L emitted from the plurality of prism projections 120 is visually seen by a viewer, while the bezel 16 that is hidden by the bezel hiding member 100 is not seen by the viewer. In other words, as the image light L is emitted from the bezel hiding member 100, the viewer may have a perception as if the screen 12 is extended into the region 110 of the bezel hiding member 100 that covers the bezel 16. I.e., the bezel hiding member 100 may accomplish a virtual extension of the image displayed on active region 11a into a portion or an entirety of the non-active region 11b.

As described above, the bezel hiding member 100 serves to optically hide the bezel 16. As described above, since the bezel hiding member 100 is arranged so as not to hide the screen 12 at all, the image that is displayed through the screen 12 is not hidden or distorted.

Accordingly, as compared with other bezel hiding members in the related art that are arranged to partially hide the screen 12, the bezel hiding member 100 according to an exemplary embodiment can prevent the distortion of the image that may occur as the screen 12 is hidden by the bezel hiding member, and thus can prevent the resulting deterioration of the image quality.

Figure 8:
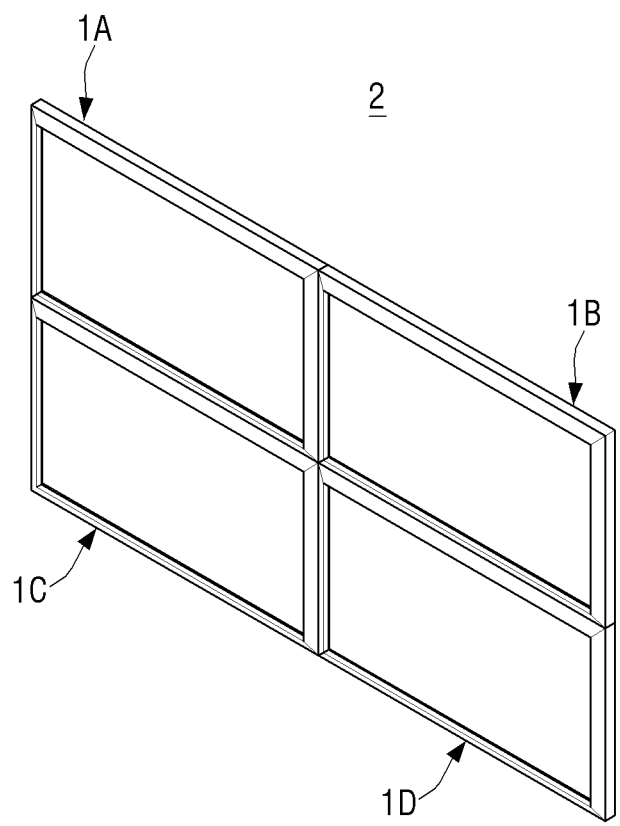
FIG. 8 is a perspective view of a multivision display apparatus according to an exemplary embodiment.
Figure 9:
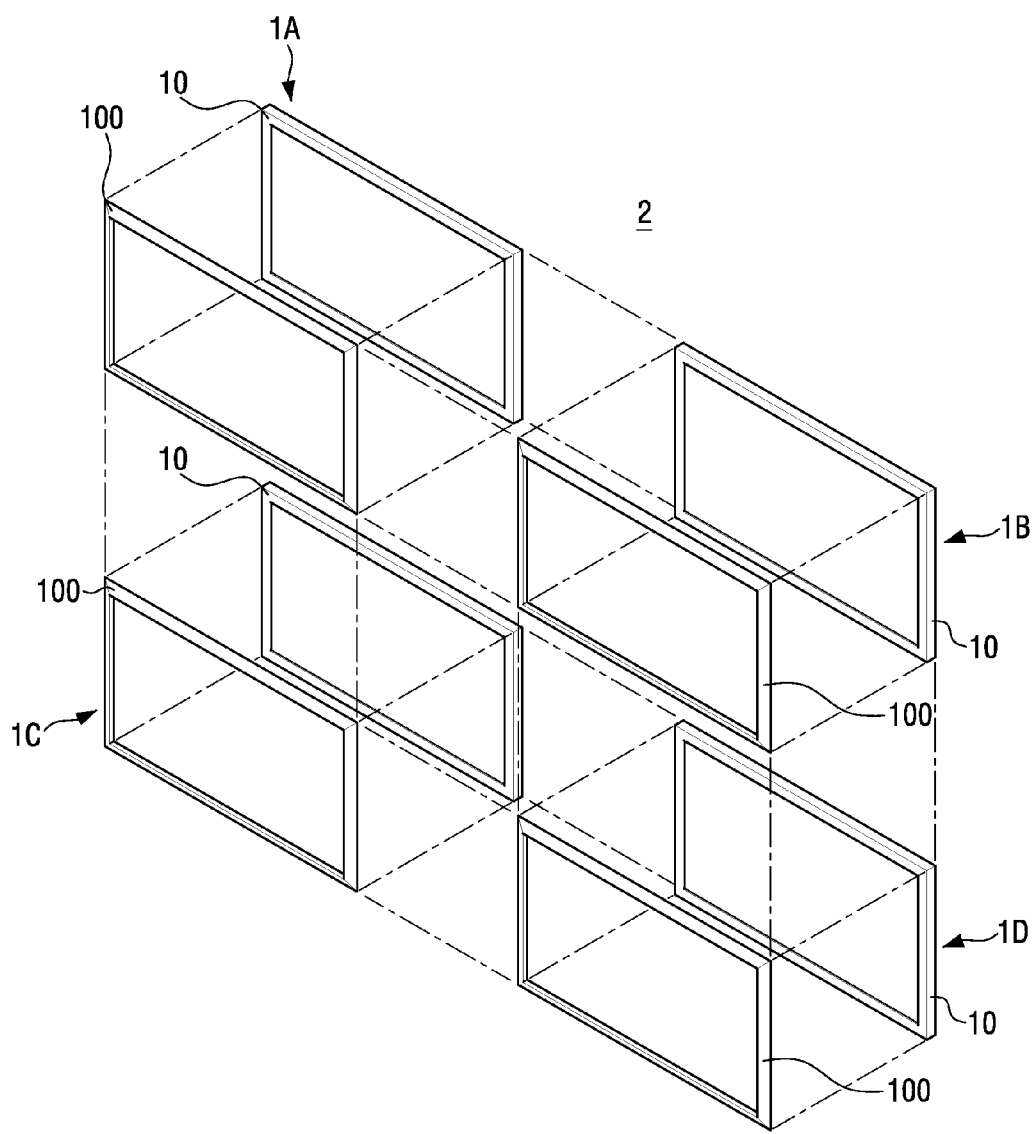
FIG. 9 is a partially exploded perspective view of the multivision display apparatus illustrated in FIG. 8.

FIG. 8 is a perspective view of a multivision display apparatus according to an exemplary embodiment, and FIG. 9 is a partially exploded perspective view of the multivision display apparatus illustrated in FIG. 8.

Referring to FIGS. 8 and 9, a multivision display apparatus 2 according to an exemplary embodiment includes a plurality of display units 1A, 1B, 1C, and 1D regularly arranged in a matrix form, i.e., an M×N array, where one of M and N is an integer greater than 0 and another one of M and N is an integer greater than 1. The multivision display apparatus 2 implements a large-scale screen (e.g., 100 inches or more) through a combination of individual screens of the plurality of display units 1A, 1B, 1C, and 1D.

The multivision display apparatus 2 as described above may be used in an open-area space in which a large-scale screen is desirable, such as an exhibition hall, a seminar room, a stadium, an observation room, surveillance room, etc. The multivision display apparatus 2 may be installed on a wall surface provided in the open area or may be independently fastened or adhered to a vertical support stand or pane affixed to a holding member or the wall surface.

In an exemplary embodiment, the multivision display apparatus 2 includes four display units 1A, 1B, 1C, and 1D which are arranged in two rows and two columns. That is, the multivision display apparatus 2 has a 2×2 arrangement. In exemplary embodiments, the multivision display apparatus 2 may have a 3×3 arrangement, a 4×4 arrangement, or a 5×5 arrangement, to provide a larger-scale screen.

Each of the display units 1A, 1B, 1C, and 1D may be provided as the display apparatus 1 as described above. Accordingly, in the same manner as the display apparatus 1, each of the display units 1A, 1B, 1C, and 1D includes a display main body 10 and a bezel hiding member 100.

Since the exemplary bezel hiding member 100 is provided in each of the display units 1A, 1B, 1C, and 1D, the bezels of the display units 1A, 1B, 1C, and 1D are not visually discernable. Accordingly, visual perception of separation of the image caused by the bezels of the display units 1A, 1B, 1C, and 1D can be minimized or substantially eliminated.

Since the bezel hiding members 100 that are applied to the respective display units 1A, 1B, 1C, and 1D are arranged so as not to invade the screens of the display units 1A, 1B, 1C, and 1D, the distortion of the image can be prevented, and thus the resulting deterioration of the image quality can be prevented.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display main body comprising a display panel and a bezel, wherein the display panel includes a front surface having a screen, and the bezel is disposed on the front surface of the display panel and surrounds the screen; and
   a bezel hiding member which is mounted on the bezel to cover the bezel and includes:
      a body portion comprising:
         an attachment surface attached to the bezel;
         a light incident surface which extends from an inner end of the attachment surface and is inclined with respect to the attachment surface such that image light emitted from an edge region of the screen is incident on the light incident surface and refracted; and
         a boundary surface which extends between an outer end of the attachment surface and an upper end of the light incident surface; and
      a plurality of prism projections formed to project from the boundary surface to emit the refracted image light in a forward direction of the screen,
   wherein the body portion is attached to the bezel so that the body portion and the plurality of prism projections do not extend past the bezel, and
   wherein the screen is an entirety of the front surface of the display panel that is not covered by the bezel.

2. The display apparatus as claimed in claim 1, wherein the attachment surface and the light incident surface are arranged so as not to obstruct or hide the screen.

3. The display apparatus as claimed in claim 1, wherein the light incident surface is arranged substantially perpendicularly to the attachment surface.

4. The display apparatus as claimed in claim 1, wherein the boundary surface comprises a single plane.

5. The display apparatus as claimed in claim 1, wherein the boundary surface comprises two or more planes.

6. The display apparatus as claimed in claim 5, wherein the boundary surface comprises:

a first boundary surface extending from the upper end of the light incident surface; and a second boundary surface extending from the first boundary surface to the outer end of the attachment surface.

7. The display apparatus as claimed in claim 6, wherein the first boundary surface is arranged in parallel to the attachment surface, and the second boundary surface is arranged to be inclined with respect to the attachment surface.

8. The display apparatus as claimed in claim 1, wherein the boundary surface is a single curved surface.

9. The display apparatus as claimed in claim 8, wherein the boundary surface is a spherical surface or an aspherical surface.

10. The display apparatus as claimed in claim 1, wherein at least one of the plurality of prism projections comprises:

a reflection surface configured to reflect the refracted image light; and a light emission surface configured to emit the reflected image light.

11. The display apparatus as claimed in claim 1, wherein each of the plurality of prism projections has a pointed or rounded outer end.

12. A multivision display apparatus comprising a plurality of displays, each of the plurality of displays comprising:

a display main body comprising a display panel and a bezel, wherein the display panel includes a front surface having a screen, and the bezel is disposed on the front surface of the display panel and surrounds the screen; and a bezel hiding member which is mounted on the bezel to cover the bezel and includes:

a body portion comprising:

an attachment surface attached to the bezel;

a light incident surface which extends from an inner end of the attachment surface and is inclined with respect to the attachment surface such that image light emitted from an edge region of the screen is incident on the light incident surface and refracted; and a boundary surface which extends between an outer end of the attachment surface and an upper end of the light incident surface; and a plurality of prism projections formed to project from the boundary surface to emit the refracted image light in a forward direction of the screen, wherein the body portion is attached to the bezel so that the body portion and the plurality of prism projections do not extend past the bezel, and wherein the screen is an entirety of the front surface of the display panel that is not covered by the bezel.

13. The multivision display apparatus as claimed in claim 12, wherein the body portion comprises:

an attachment surface attached to the bezel;

a light incident surface which extends from an inner end of the attachment surface and on which the emitted image light is incident; and a boundary surface which extends between an outer end of the attachment surface and an upper end of the light incident surface and forms a boundary with the plurality of prism projections.

14. The multivision display apparatus as claimed in claim 13, wherein the attachment surface and the light incident surface are arranged so as not to obstruct or hide the screen.

15. A bezel hiding member for a display apparatus, the bezel hiding member comprising:

an attachment surface attached to a bezel that is disposed on a front surface of a display panel and surrounds a screen of the display panel;

a light incident surface which extends from an inner end of the attachment surface and is inclined with respect to the attachment surface such that image light emitted from the screen is incident on the light incident surface and refracted;

a boundary surface which extends between the outer end of the attachment surface and an upper end of the light incident surface and transmits the refracted image light in a front direction of the screen; and optical members which are formed on the boundary surface and change a path of the transmitted image light toward a front side of the display apparatus, wherein the attachment surface is attached to the bezel so that the light incident surface and the optical members do not extend past the bezel, and wherein the screen is an entirety of the front surface of the display panel that is not covered by the bezel.

16. The bezel hiding member of claim 15, wherein at least one of the optical members comprises:

a light reflection surface which is disposed proximate the outer end of the attachment surface and configured to reflect the transmitted image light, and a light emission surface which is disposed proximate the inner end of the attachment surface, and is configured to refract and emit the image light reflected by the light reflection surface, in substantially a same direction as the image light emitted by the screen.

17. The bezel hiding member of claim 16, wherein the light emission surface is connected to the light reflection surface to form a substantially triangular cross-section.

* * * * *